US012571364B2

(12) United States Patent
Magnuson et al.

(10) Patent No.: US 12,571,364 B2
(45) Date of Patent: Mar. 10, 2026

(54) SLIDING CAM FOLLOWER

(71) Applicant: Cummins Inc., Columbus, IN (US)

(72) Inventors: Samuel David Griffith Magnuson, Louisville, KY (US); Donald J. Benson, Columbus, IN (US); Matthew B. State, Indianapolis, IN (US); Eric A. Benham, Columbus, IN (US); Aleksandr E. Lesin, Columbus, IN (US); Karthik Sethuraman, Columbus, IN (US)

(73) Assignee: Cummins Scania HPCR System, LLC, Columbus, IN (US)

( * ) Notice: Subject to any disclaimer, the term of this patent is extended or adjusted under 35 U.S.C. 154(b) by 35 days.

(21) Appl. No.: 18/160,556

(22) Filed: Jan. 27, 2023

(65) Prior Publication Data

US 2023/0167794 A1 Jun. 1, 2023

Related U.S. Application Data

(63) Continuation of application No. PCT/US2021/045957, filed on Aug. 13, 2021.
(Continued)

(51) Int. Cl.
*F02M 59/10* (2006.01)
*F02M 59/06* (2006.01)
(Continued)

(52) U.S. Cl.
CPC .......... *F02M 59/102* (2013.01); *F02M 59/06* (2013.01); *F04B 1/0426* (2013.01); *F04B 1/053* (2013.01); *F04B 9/042* (2013.01)

(58) Field of Classification Search
CPC .... F02M 59/06; F02M 59/102; F04B 1/0426; F04B 1/053; F04B 1/0536; F04B 1/0538; F04B 9/042
(Continued)

(56) References Cited

U.S. PATENT DOCUMENTS 1,976,518 A 10/1934 Rockwell
2,657,634 A * 11/1953 Greenland ................ F03C 4/00 91/474
(Continued)

FOREIGN PATENT DOCUMENTS

CN 102939456 A * 2/2013 ............. F02M 59/06
CN 106089619 A * 11/2016
(Continued)

OTHER PUBLICATIONS

International Search Report and Written Opinion, PCT Appln. No. PCT/US21/45957, Nov. 22, 2021, 9 pgs.

*Primary Examiner* — Alexander B Comley
(74) *Attorney, Agent, or Firm* — Taft, Stettinius & Hollister LLP

(57) ABSTRACT

The present disclosure provides a high-pressure fuel pump including a barrel unit, a plunger, and a camshaft assembly having an eccentric cam lobe including a surface of the lobe. A follower is provided between the plunger and the surface of the lobe of the camshaft assembly to facilitate translation between the rotational movement of the camshaft assembly to axial movement of the plunger. The follower includes arcuate surfaces configured to mate with corresponding arcuate surfaces of the lobe of the cam shaft assembly and the plunger, respectively.

21 Claims, 14 Drawing Sheets

Related U.S. Application Data

(60) Provisional application No. 63/065,741, filed on Aug. 14, 2020.

(51) Int. Cl.
*F04B 1/0426* (2020.01)
*F04B 1/053* (2020.01)
*F04B 9/04* (2006.01)

(58) Field of Classification Search
USPC ............... 123/90.5, 495, 496, 500–504, 508; 74/569
See application file for complete search history.

(56) References Cited

U.S. PATENT DOCUMENTS

| | | | | | |
|---|---|---|---|---|---|
| 3,089,473 | A * | 5/1963 | Kueny | F01L 1/14 | 123/90.51 |
| 4,357,925 | A * | 11/1982 | Woodruff | F02M 41/1411 | 417/462 |
| 4,366,785 | A | 1/1983 | Goloff et al. | | |
| 4,531,492 | A | 7/1985 | Gibson | | |
| 4,850,095 | A | 7/1989 | Akao et al. | | |
| 4,893,592 | A | 1/1990 | Falero | | |
| 4,909,197 | A * | 3/1990 | Perr | F02M 59/102 | 123/90.39 |
| 5,211,143 | A | 5/1993 | Fontichiaro et al. | | |
| 5,220,941 | A | 6/1993 | Tuckey | | |
| 5,803,033 | A | 9/1998 | Naruoka | | |
| 5,832,889 | A | 11/1998 | Naruoka et al. | | |
| 6,237,441 | B1 * | 5/2001 | Nishioka | F04B 1/0413 | 123/90.51 |
| 6,250,893 | B1 | 6/2001 | Streicher | | |
| 6,347,547 | B1 | 2/2002 | Guentert et al. | | |
| 6,354,745 | B1 * | 3/2002 | Ai | F16C 19/26 | 384/568 |
| 6,845,748 | B2 | 1/2005 | Kobayashi et al. | | |
| 8,522,745 | B2 | 9/2013 | Doss | | |
| 9,567,960 | B2 * | 2/2017 | Crofts | F01L 1/146 | |
| 10,273,901 | B2 | 4/2019 | Fluharty et al. | | |
| 2002/0189438 | A1 * | 12/2002 | Furuta | F02M 63/0225 | 92/72 |
| 2003/0062085 | A1 * | 4/2003 | Onishi | F04B 1/0426 | 123/514 |
| 2006/0222517 | A1 * | 10/2006 | Breuer | F02M 59/102 | 417/273 |
| 2011/0073078 | A1 * | 3/2011 | Vallon | F04B 1/0426 | 123/495 |
| 2016/0201630 | A1 * | 7/2016 | Smith | F16H 53/06 | 476/67 |
| 2017/0001237 | A1 | 1/2017 | Neukirchner et al. | | |
| 2018/0171949 | A1 * | 6/2018 | Shaull | F04B 1/0413 | |

FOREIGN PATENT DOCUMENTS

| | | | | |
|---|---|---|---|---|
| CN | 106917709 | A * | 7/2017 | |
| CN | 106939804 | A * | 7/2017 | F01L 1/14 |
| CN | 109790827 | A * | 5/2019 | F01L 1/14 |
| CN | 110714866 | A * | 1/2020 | F02M 59/102 |
| DE | 10247142 | A1 * | 4/2004 | F02M 59/06 |
| DE | 10047188 | B4 * | 8/2005 | F02M 59/06 |
| DE | 102005046670 | A1 * | 4/2007 | F02M 59/102 |
| DE | 102007018038 | A1 | 10/2008 | |
| DE | 102007055263 | A1 * | 5/2009 | F02M 59/06 |
| DE | 102009000965 | A1 * | 8/2010 | F02M 55/025 |
| DE | 102009002520 | A1 * | 10/2010 | F02M 59/102 |
| DE | 102010030498 | A1 * | 12/2011 | F01B 23/00 |
| DE | 102010041178 | A1 * | 3/2012 | F02M 59/102 |
| DE | 102015223571 | A1 * | 6/2017 | F02M 59/102 |
| DE | 102016208935 | A1 * | 11/2017 | |
| DE | 102017109405 | A1 * | 11/2018 | |
| DE | 102018204505 | A1 * | 9/2019 | |
| DE | 102018205866 | A1 | 10/2019 | |
| DE | 102018214200 | A1 * | 2/2020 | |
| EP | 0976926 | A2 * | 2/2000 | |
| GB | 379668 | | 8/1932 | |
| GB | 2543500 | A * | 4/2017 | F02M 37/043 |
| GB | 2548900 | A * | 10/2017 | F01L 1/14 |
| KR | 101730993 | B1 * | 4/2017 | |
| WO | WO-2010015436 | A1 * | 2/2010 | F04B 23/103 |
| WO | WO-2014206609 | A1 * | 12/2014 | F02M 59/06 |
| WO | WO-2016091609 | A1 * | 6/2016 | |

* cited by examiner

SLIDING CAM FOLLOWER

CROSS-REFERENCE TO RELATED APPLICATIONS

This application is a continuation to International PCT Application No. PCT/US2021/045957 filed on Aug. 13, 2021, which claims priority to U.S. Provisional Application No. 63/065,741 filed on Aug. 14, 2020, which are incorporated herein by reference in their entirety for all purposes.

TECHNICAL FIELD OF THE PRESENT DISCLOSURE

The present disclosure generally relates to cam-operated high-pressure fuel pumps. Specifically, the present disclosure relates to an interface device, or follower, utilized to facilitate transitional movement between a camshaft assembly and a plunger of a high-pressure fuel pump.

BACKGROUND OF THE PRESENT DISCLOSURE

High-pressure fuel pumps are common components of fuel systems for internal combustion engines, especially in diesel engines. High-pressure pumps often receive fuel from a low-pressure system before entering a common rail and ultimately the engine via fuel injectors. The fuel is then compressed and exits the pump. Each of these actions are initiated through movement of a plunger controlled by rotation of a camshaft. For example, in high-pressure pumps, fuel is drawn through a fuel inlet as the plunger is lowered relative to a respective barrel containing the plunger. When the plunger then moves upwards, the fuel is compressed, increasing the pressure of the fuel. The fuel then exits the pump to enter the common rail or another fuel system component.

Typically, the plunger includes a generally flat plunger foot that contacts a generally flat cam ring contact surface. While such an arrangement allows for translation of rotational movement of the camshaft to axial movement of the plunger, this arrangement results in poor peak pressure capability, inefficiency, and premature fatigue and wear of parts.

SUMMARY OF THE DISCLOSURE

The present disclosure provides a high-pressure fuel pump including a barrel unit, a plunger, and a camshaft assembly having an eccentric cam lobe including a cam ring. A follower is provided between the plunger and the cam ring to facilitate translation between the rotational movement of the camshaft assembly to axial movement of the plunger. The follower includes arcuate surfaces configured to mate with corresponding arcuate surfaces of the cam ring and the plunger, respectively.

In a first aspect of the present disclosure, a fuel pump is disclosed. The fuel pump comprises a camshaft assembly including an offset lobe having a lobe surface, the lobe surface defining a first arcuate surface and the camshaft assembly configured to rotate about a first axis. The fuel pump further comprises a barrel unit disposed on the fuel pump and having a second axis substantially perpendicular to the first axis. A plunger is disposed within the barrel unit, the plunger including a foot having a second arcuate surface, and a follower is disposed between the foot of the plunger and the lobe surface, the follower having a third arcuate surface in contact with the second arcuate surface and fourth arcuate surface in contact with the first arcuate surface.

In another aspect of the present disclosure, a barrel unit for a fuel pump is disclosed, the barrel unit comprising a plunger disposed within the barrel unit and including a foot having a first arcuate surface. The barrel unit further comprises a follower having a second arcuate surface in contact with the first arcuate surface and a third arcuate surface configured to contact a camshaft assembly.

In yet another aspect of the present disclosure, a fuel pump is disclosed, the fuel pump comprising a camshaft assembly including an offset lobe having a lobe surface, the camshaft assembly configured to rotate about a first axis. The fuel pump further discloses a barrel unit disposed on the fuel pump and including a plunger disposed within the barrel unit, the plunger configured to axially move within the barrel unit along a second axis; and a follower disposed between the plunger and the lobe surface, the follower configured to have a sliding relationship with each of the plunger and the lobe surface to facilitate translation of rotational movement of the camshaft assembly to axial movement of the plunger.

In another aspect of the present disclosure, a barrel unit for a fuel pump is disclosed, the barrel unit comprising a plunger disposed within the barrel unit and a follower having a first surface in contact with the plunger and a second surface configured to contact a camshaft assembly. The barrel unit further comprises a keeper having a lower portion coupled to the follower and an upper portion extending beyond the first surface of the follower to surround a portion of the plunger, the upper portion having magnetic properties.

In yet another aspect of the present disclosure, a keeper for use with a fuel pump is disclosed. The keeper comprises a lower portion defining a first outer circumference, the lower portion configured to receive at least a portion of a follower of the fuel pump, and an upper portion having magnetic properties. The upper portion defines a second outer circumference and is configured to surround a portion of a plunger of the fuel pump.

In various aspects of the disclosure, the disclosed fuel pump may comprise a plurality of barrel units disposed on the fuel pump. In such an embodiment, the plurality of barrel units may be arranged in an opposed piston pump arrangement.

In various aspects of the disclosure, movement of the follower and the plunger may define a contact interface between the follower and the plunger, wherein the contact surface forms a circle.

In various aspects of the disclosure, movement of the follower and plunger may define a contact interface between the follower and the plunger, wherein the contact surface forms a ring shape.

In various aspects of the disclosure, a spring may be positioned within the barrel unit and disposed around the plunger to bias the plunger towards the camshaft assembly.

In various aspects of the disclosure, an axial motion of the plunger may correspond with the rotational movement of the camshaft assembly.

In various aspects of the disclosure, the second arcuate surface of the follower and the third arcuate surface of the follower are concave spherical surfaces.

In various aspects of the disclosure, the second arcuate surface of the follower is a convex spherical surface and the third arcuate surface of the follower is a concave spherical surface.

In various aspects of the disclosure, a first center of the first arcuate surface does not contact a second center of the second arcuate surface.

In various aspects of the disclosure, the arcuate surface of the foot of the plunger is a convex spherical surface.

In various aspects of the disclosure, the foot of the plunger is a concave spherical surface.

In various aspects of the disclosure, the follower includes a first arcuate surface and a second arcuate surface. In such an embodiment, the first arcuate surface and the second arcuate surface may be asymmetrical. In such an embodiment, the plunger may comprise an end portion configured to contact the first arcuate surface of the follower. In such an embodiment, the end portion of the plunger may comprise a foot.

In various aspects of the disclosure, the disclosed fuel pump or the disclosed barrel unit may comprise a keeper, wherein the keeper comprises a lower portion configured to couple to the follower and an upper portion having magnetic properties, wherein the upper portion surrounds at least a portion of the foot of the plunger.

In various aspects of the disclosure in which a keeper is included, the upper portion of the keeper may define a plurality of apertures, wherein each of the plurality of apertures is configured to receive a magnet.

In various aspects of the disclosure in which a keeper is included, the lower portion of the keeper defines a plurality of tabs.

In various aspects of the disclosure in which a keeper is included, the keeper may be coupled to the follower via an interference fit or press fit.

In various aspects of the disclosure in which a keeper is included, the keeper may be a shaped magnetic ring.

In various aspects of the disclosure in which a keeper is included, an interior surface of the lower portion of the keeper may define a groove configured to receive a portion of the follower.

In various aspects of the disclosure in which a keeper is included, the upper portion of the keeper may extend beyond the first surface of the follower. In such an embodiment, the upper portion of the keeper extending beyond the first surface of the follower may define an arcuate surface.

In various aspects of the disclosure in which a keeper is included, the first outer circumference defined by the lower portion and the second outer circumference defined by the upper portion is substantially the same.

In various aspects of the disclosure in which a keeper is included, the first outer circumference defined by the lower portion may be relatively less than the second outer circumference defined by the upper portion.

In various aspects of the disclosure in which a keeper is included, a first inner circumference defined by the lower portion is relatively less than a second inner circumference defined by the upper portion.

Additional features and advantages of the present disclosure will become apparent to those skilled in the art upon consideration of the following detailed description of the illustrative embodiments exemplifying the disclosure as presently perceived.

BRIEF DESCRIPTION OF THE DRAWINGS

The detailed description of the drawings particularly refers to the accompanying figures in which:

FIG. 3B is a schematic view of the load distribution between the follower and the camshaft assembly of FIG. 3A;

Figure 1:
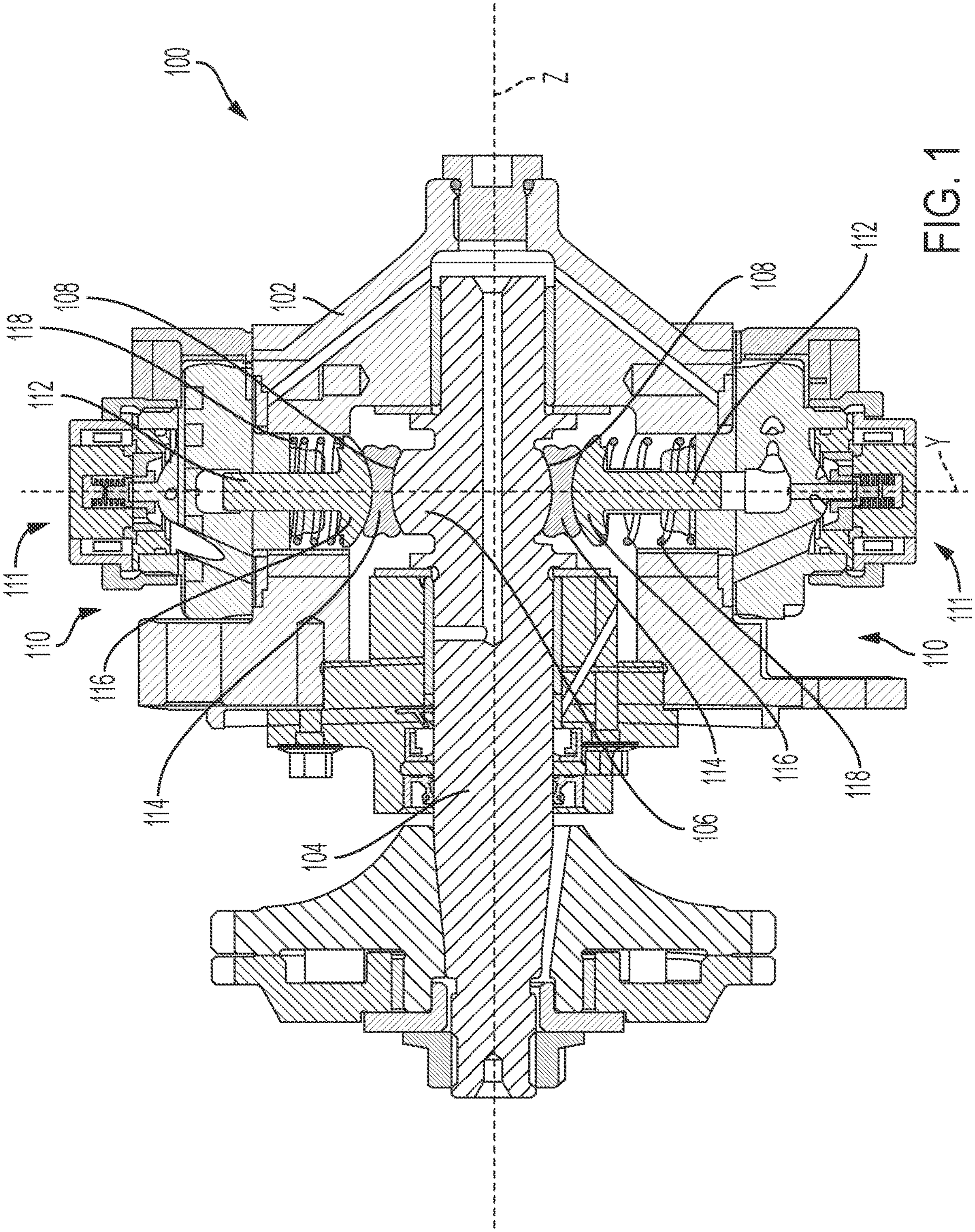
FIG. 1 is a cross-sectional view of a high-pressure fuel pump including a camshaft assembly and a pair of barrel units, each barrel unit including a plunger and a follower disposed between the plunger and the camshaft assembly.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplification set out herein illustrates an embodiment of the invention, and such an exemplification is not to be construed as limiting the scope of the invention in any manner.

DETAILED DESCRIPTION OF THE DRAWINGS

Referring initially to FIG. 1, a high pressure fuel pump 100 is shown. As illustrated, the pump 100 may be an opposed piston pump as further discussed and disclosed in PCT Application Serial No. PCT/US20/21950 filed on Mar. 11, 2020, and titled COMPACT OPPOSED PISTON PUMP, the disclosure of which is hereby incorporated by reference in its entirety. The features further discussed herein may also apply to conventional linear pumps or any other pump having a cam-plunger interface as further discussed herein.

The pump 100 includes a housing 102 and a camshaft assembly 104 disposed through the housing 102. The camshaft assembly 104 is configured to rotate about an axis Z and includes at least one offset lobe 106 discussed further herein and a surface 108 of the lobe 106 of the camshaft assembly 104 encircling the at least one offset lobe 106. In other embodiments, the camshaft assembly 104 is configured to include a cam ring encircling the at least one offset lobe. At least one barrel unit 110 is disposed on the housing 102, which includes a plunger 112 disposed within the barrel unit 110.

As shown, the pump 100 may include two barrel units 110, each with a plunger 112. In other embodiments, the pump 100 may include four, six, eight, or any other number of barrel units 110 that provide for function of the pump 100. The surface 108 of the lobe 106 of the camshaft assembly 104 contacts a follower 114, which is sandwiched between the surface 108 of the lobe 106 and a foot 116 of the plunger 112 as discussed further herein. A spring 118 may be included within the respective barrel unit 110 and disposed around the respective plunger 112 to bias the plunger 112 toward the camshaft assembly 104. As the camshaft assembly 104 rotates, the feet 116 of the respective plungers 112 follow the movement of the surface 108 of the lobe 106 and the lobe 106 to transfer the rotational movement of the camshaft assembly 104 to longitudinal movement of the plungers 112 within their respective barrels 110 along axis Y, which may be positioned generally perpendicular to axis Z, and may be a center axis of each of the barrel 110 and its respective plunger 112. In other words, the axis Y corresponds with both the barrel 110 and its respective plunger 112.

The fuel is metered via a metering valve 111 to control the inlet flow of fuel from a source such as a low pressure pump (not shown). The movement of each plunger 112 within each respective barrel unit 110 is translated to compression of the fuel within the pump 100 and outflow of the compressed fuel to the remainder of the fuel system of the engine (not shown). As the plungers 112 follow the movement of the camshaft assembly 104, the bias from the springs 118 may be overcome to allow the plungers 112 to move within their respective barrels 110. As the plunger 112 moves in a direction generally away from the camshaft assembly 104, it interacts with the metering valve system to control the pumping of fuel for engine operation. The pump 100 may include one barrel unit 110 or multiple barrel units 110 in an opposed piston pump arrangement as shown and discussed further below. In other embodiments, the barrel unit(s) may be utilized in a conventional linear piston arrangement.

Figure 2A:
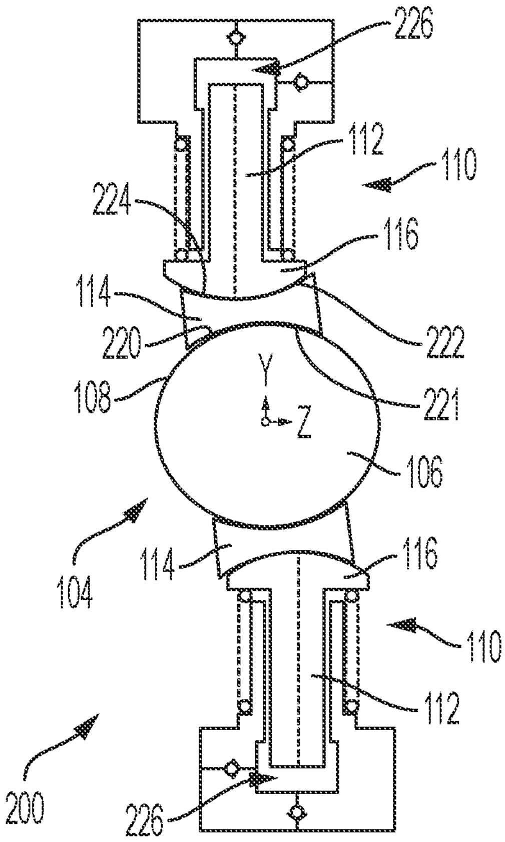
FIG. 2A is a cross-sectional view of the barrel units of FIG. 1 taken along the x, y axes of the barrel units.

Now referring to FIG. 2A, an illustrative embodiment of an assembly 200 including a plunger 112, a follower 114, a barrel unit 110, and a camshaft assembly 104 as described in reference to FIG. 1 taken along an X, Y cross-section corresponding with axes X, Y (FIG. 1). The assembly 200 as shown comprises an opposed piston arrangement, but may also comprise a linear arrangement as discussed in reference to FIG. 1 above. Additionally, although the illustrated embodiment includes a pair of offset barrel units 110 as further discussed in PCT Application Serial No. PCT/US20/21950 mentioned above, the barrel units 110 may be arranged in a centered arrangement in other embodiments. As shown, the follower 114 includes a first arcuate surface 220 in contact with a respective surface 108 of the lobe 106 of the camshaft assembly 104 having a corresponding arcuate surface 221 and a second arcuate surface 222 in contact with a foot 116 of the plunger 112. The foot 116 has a corresponding arcuate surface 224. In the illustrated embodiment, the first arcuate surface 220 of the follower 114 and the second arcuate surface 222 of the follower 114 are concave spherical surfaces, while the arcuate surface 224 of the foot 116 of the plunger 112 is a convex spherical surface.

Figure 2B:
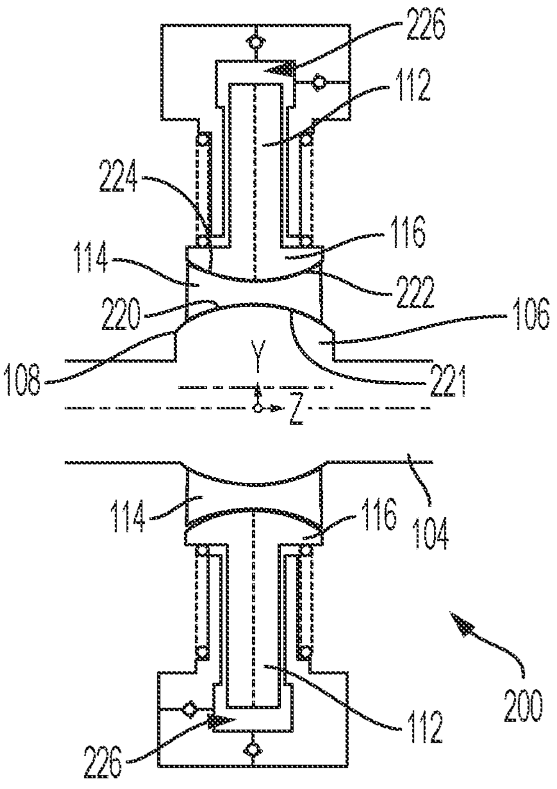
FIG. 2B is a cross-sectional view of the barrel units of FIG. 1 taken along the y, z axes of the barrel units.

Another view of the assembly 200 can be seen in FIG. 2B taken along a Y, Z cross-section corresponding with axes Y, Z, wherein axis Z lays substantially perpendicular to axes X, Y. As shown in both FIGS. 2A and 2B, the arcuate surface 224 of the plunger foot 116 has a surface area larger than the surface area of the mating arcuate surface 222 of the follower 114. During operation, the follower 114 slides on the surfaces of both the foot 116 of the plunger 212 and the surface 108 of the lobe 106 of the camshaft assembly 104 to translate the rotational movement of the camshaft assembly 104 into vertical plunger motion. The barrel 110 and the plunger 112 cooperate to form a fuel pressurizing chamber 226, and the axial motion of the plunger 112 corresponds with the rotational movement of the camshaft assembly 104 to pressurize fuel within the chamber 226 and deliver the pressurized fuel to the remainder of the fuel system as discussed above.

Figure 2C:
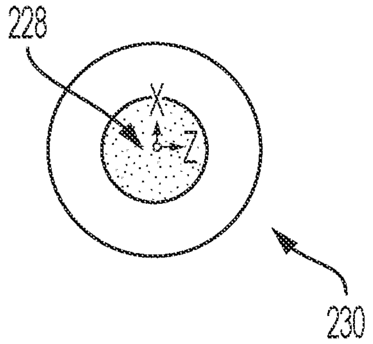
FIG. 2C is a schematic view of the load distribution between the follower and the camshaft assembly of FIG. 1.
Figure 2D:
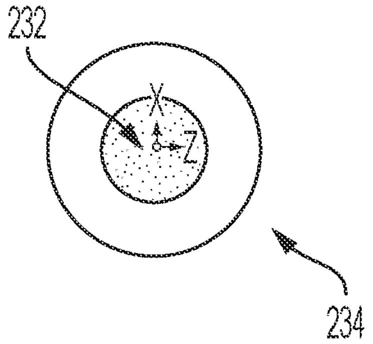
FIG. 2D is a schematic view of the load distribution between the follower and the plunger of FIG. 1.

As shown in FIGS. 2C and 2D with reference to FIGS. 2A and 2B, as the follower 114 on the arcuate surfaces 221 and 224 of the camshaft assembly 104 and the foot 116 of the plunger 112 respectively, the load of the plunger movement is distributed across a contact patch 228 of the interface 230 between the follower 114 and the respective surface 108 of the lobe and a contact patch 232 of the interface 234 between the follower 114 and the respective plunger 112. The contact patch 228 provides a sufficient surface area to build a lubrication film which facilitates the sliding motion of the follower 114 between the surface 108 of the lobe and the plunger 112 while providing minimal wear. As shown, the contact patch 228, 232 may define a circle, an ellipse, a squircle, or another shape. The radial load resulting from the mating arcuate surfaces 220, 221, 222, 224, keeps the follower 114 constrained in place throughout the entirety of the revolution of the camshaft assembly 104, which eliminates the need for additional thrust control while allowing the camshaft assembly 104 to have integrated thrust surfaces that would otherwise prevent the assembly of the surface 108 of the lobe 106 of the camshaft assembly 104 in the axial direction.

Figure 3A:
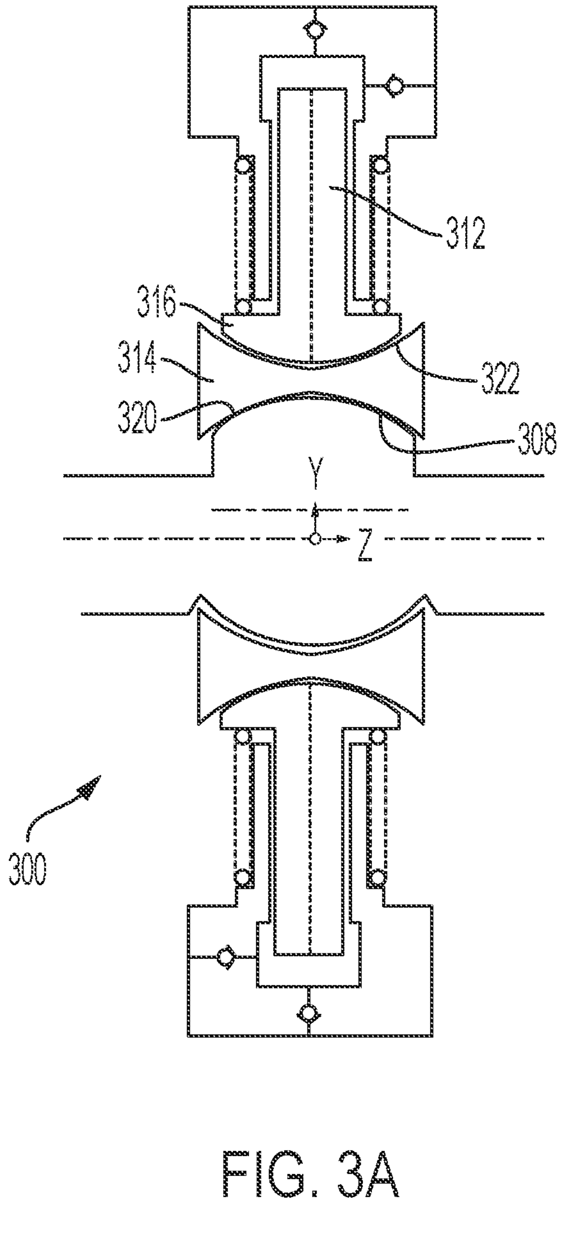
FIG. 3A is a cross-sectional view of another embodiment of a barrel unit taken along the y, z axes of the barrel unit, the barrel unit including a plunger and a follower disposed between the plunger and a camshaft assembly.
Figure 3A:
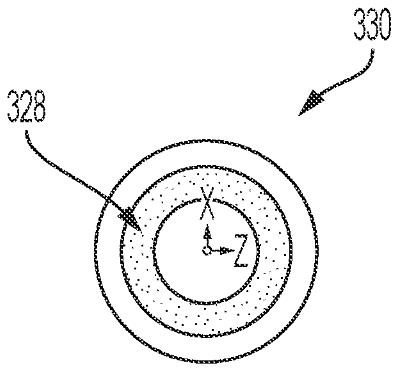
Figure 3C:
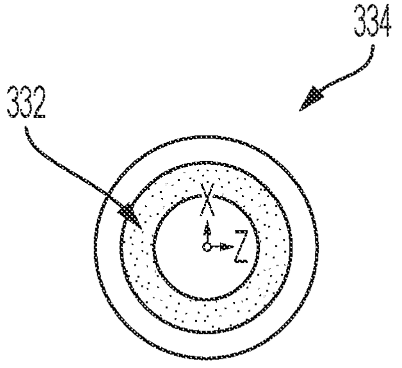
FIG. 3C is a schematic view of the load distribution between the follower and the plunger of FIG. 3A.
Figure 4:
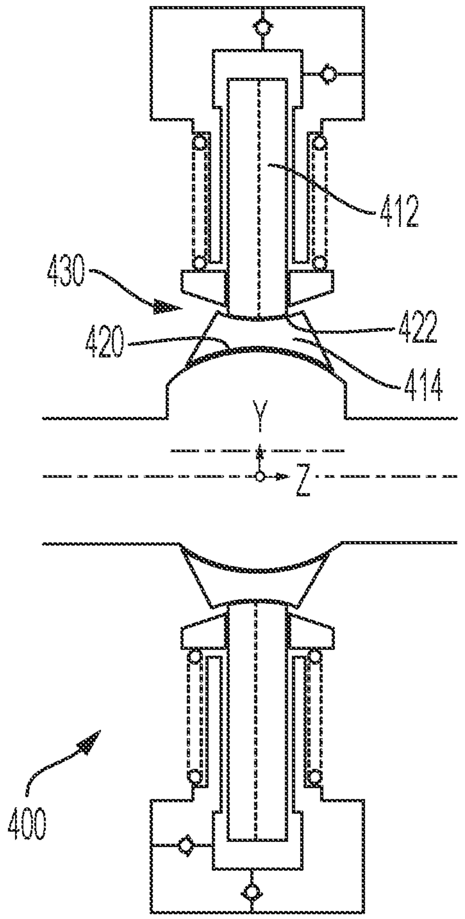
FIG. 4 is a cross-sectional view of another embodiment of a barrel unit taken along the y, z axes of the barrel unit, the barrel unit including a plunger and a follower disposed between the plunger and a camshaft assembly.
Figure 5:
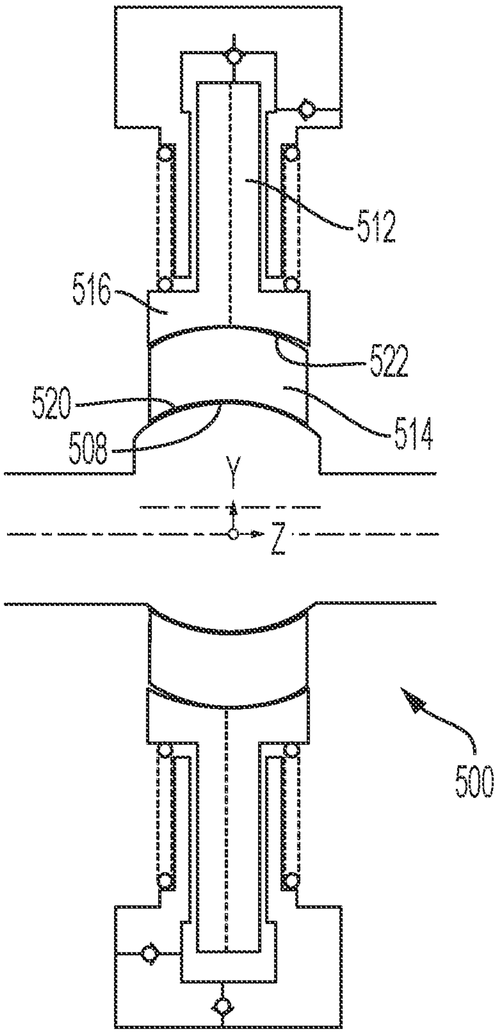
FIG. 5 is a cross-sectional view of another embodiment of a barrel unit taken along the y, z axes of the barrel unit, the barrel unit including a plunger and a follower disposed between the plunger and a camshaft assembly.

FIG. 3A provides an assembly 300, which is substantially the same as assembly 200 with the differences further discussed herein. The arcuate surfaces 320, 322 of the follower 314 are irregular, so that, as shown in FIG. 3B, the contact patch 328 formed at the interface 330 between the follower 314 and the respective surface 308 of the lobe 306 is ring or donut-shaped and, as shown in FIG. 3C, the contact patch 332 formed at the interface 334 between the follower 314 and the respective plunger 312 is ring or donut-shaped. FIGS. 4 and 5 further illustrate assembly 400 and assembly 500 respectively, which are substantially the same as assemblies 200 and 300 with the differences further discussed herein. For example, as shown in FIG. 4, the plunger 412 does not include a foot. Instead, the asymmetrical sizes of the arcuate surface 420, 422 of the follower allow an end portion 430 of the plunger 412 to sufficiently mate with the follower 414 to achieve the same function described herein. As shown in FIG. 5, the follower 514 is asymmetric and provides a combination of concave or convex arcuate surfaces 520 and 522 that results in a distributed contact load as described above and a relative sliding motion between the follower 514, the plunger 512, and the surface 508 of the lobe 506 as discussed above. All of the above-mentioned arrangements are configured to improve fatigue capability of the plunger at the plunger foot transition, reduce force on the plunger to barrel side loading forces to reduce both wear and scuffing power losses, force a sliding motion at the plunger foot and cam lobe interface to prevent rolling, provide internal forces to limit motion of the follower along the Z axis and lessen or eliminate the need for an additional Z axis thrust load carrying feature, and distribute loading between components.

As discussed above, any of the disclosed followers 114, 314, 414, 514 generally keep connected to the corresponding plunger 112, 312, 412, 512 under the plunger spring load at an allowable limit of the pump camshaft angular velocity. In other words, the allowable limit is an angular velocity of the camshaft assembly 104 at which the follower 114, 314, 414, 514 is still connected to the corresponding plunger 112, 312, 412, 512, under the plunger spring load. The maximum allowable limit of the pump camshaft angular velocity may be referred to as the no follow speed limit for the given pump. At the angular velocity below the no follow speed limit, the plunger 112, 312, 412, 512 and corresponding follower 114, 314, 414, 514 are kept in contact with the camshaft lobe 106, 306, 506 by the plunger spring load.

Figure 6:
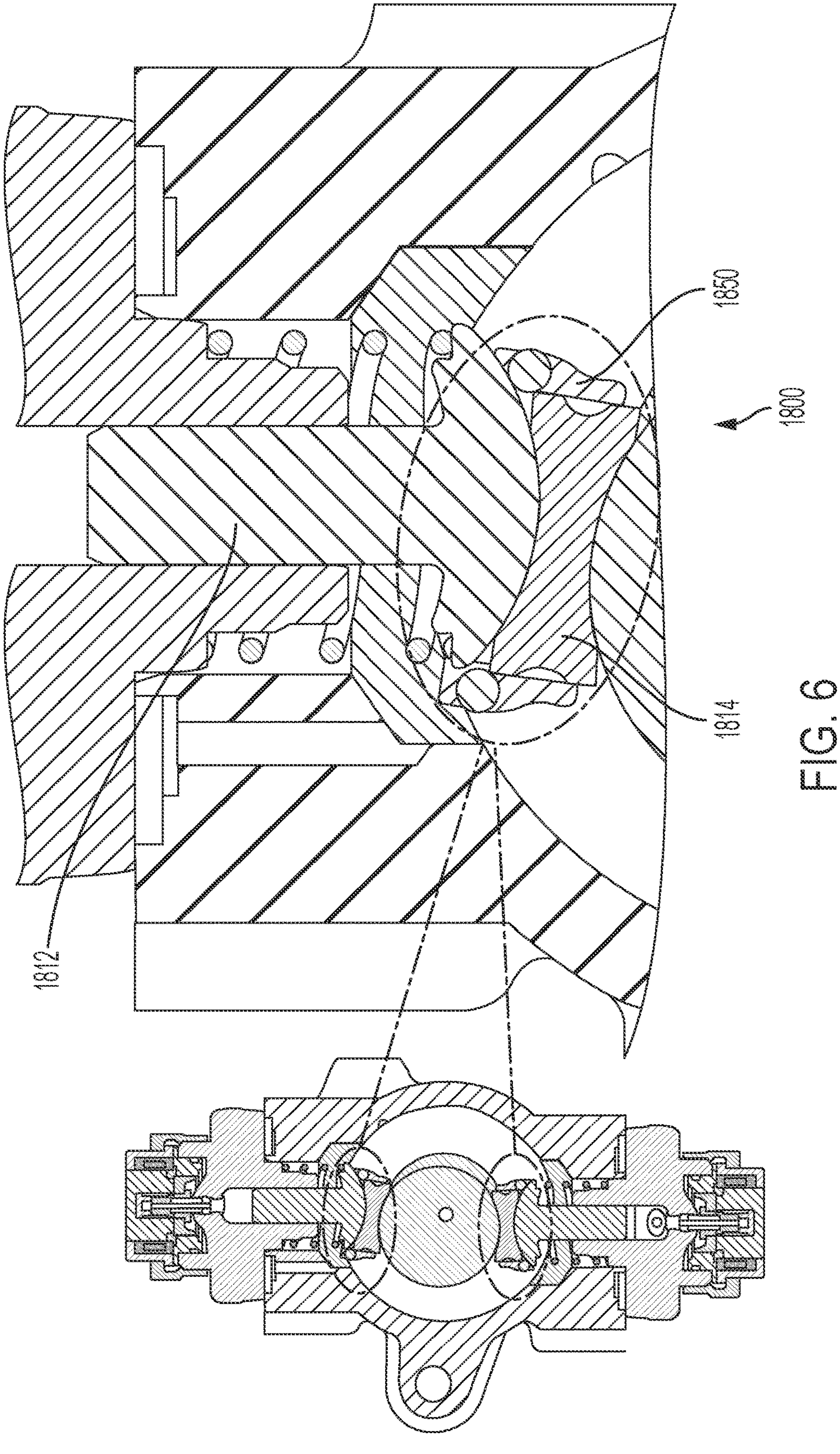
FIG. 6 is a cross-sectional view of a high-pressure fuel pump including a camshaft assembly and a pair of barrel units, each barrel unit including a plunger, a keeper, and a follower disposed between the plunger and the camshaft assembly.
Figure 7A:
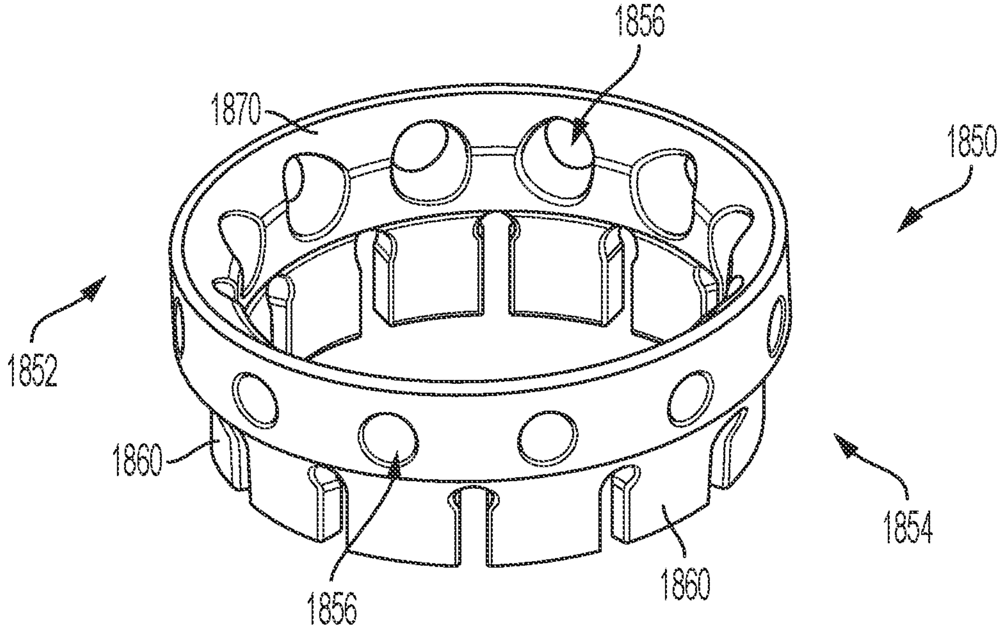
FIG. 7A is a perspective view of an illustrative embodiment of a keeper of FIG. 6.
Figure 7B:
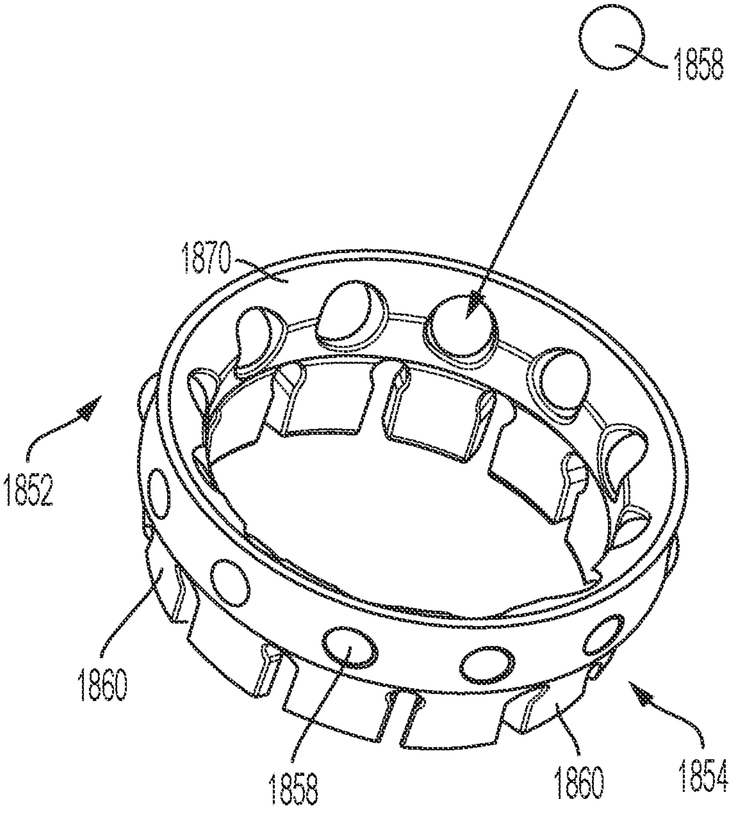
FIG. 7B is a perspective view of the keeper of FIG. 7A, including magnets held within the keeper.
Figure 7C:
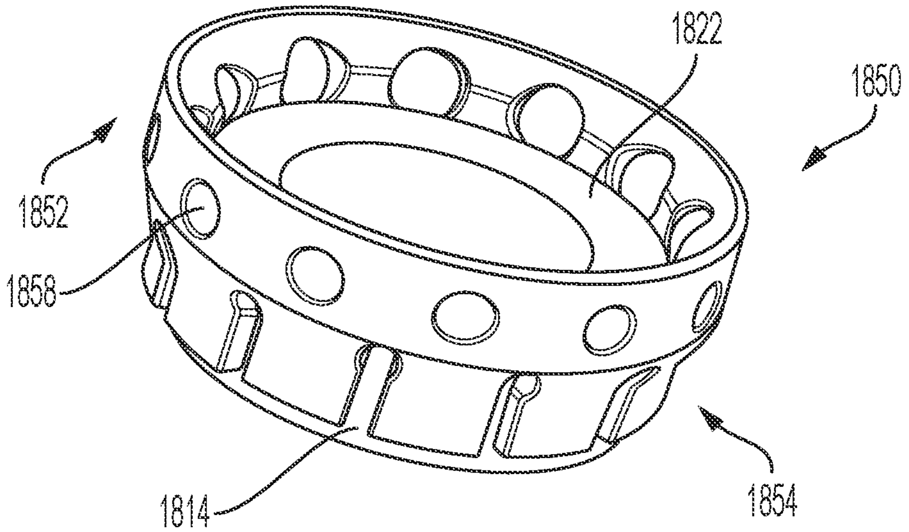
FIG. 7C is a perspective view of the keeper of FIG. 7B coupled with the follower of FIG. 6.
Figure 7D:
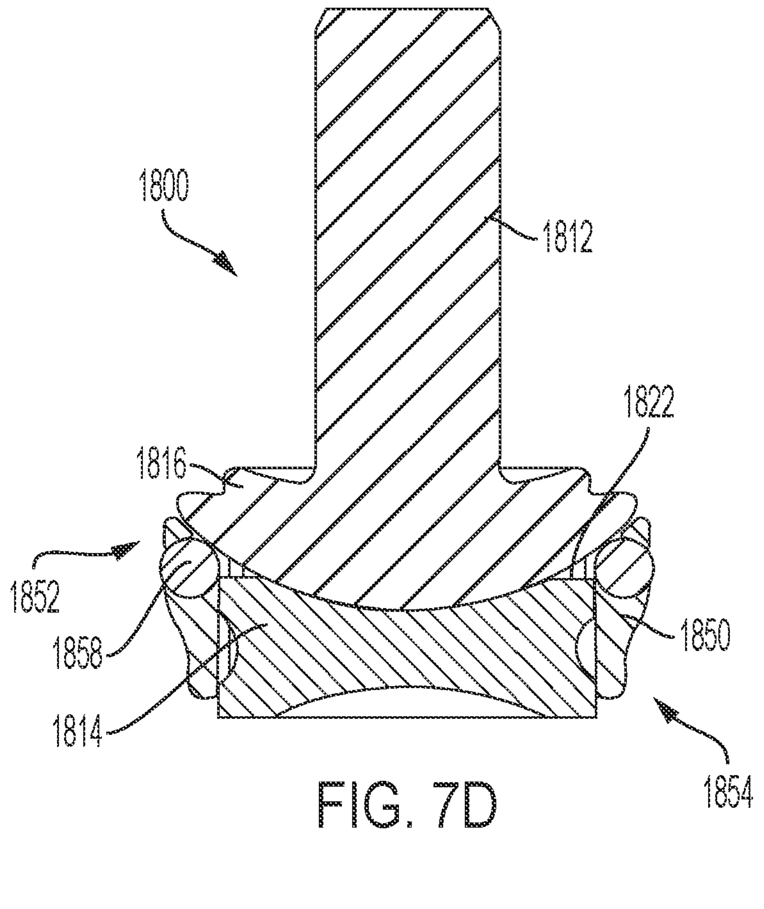
FIG. 7D is a cross-sectional view of a single barrel unit of FIG. 6.

Referring to FIGS. 6-7D, a keeper 1850 may be utilized to keep the follower 1814, which is interchangeable with any of the followers 114, 314, 414, 514 disclosed herein, connected to the corresponding plunger 1812, which is interchangeable with any of the plungers 112, 312, 412, 512 disclosed herein. As illustrated by FIG. 6, a keeper 1850 may be positioned around each of the followers 1814 of a pump assembly 1800, which may generally include the characteristics of pump 100 and any of assembly 200, 300, 400, 500 as disclosed herein. The keeper 1850 is illustratively removably coupled to the follower 1814 via interference fit or press fit. In other embodiments, the keeper 1850 may be coupled to the follower 1814 using other mechanisms known in the art, whether fixedly or removably, including, but not limited to, mechanical fasteners, adhesive, unitary manufacturing, threading, tab-in-groove, and snap-fit. The keeper 1850 is sized and shaped to generally surround a portion of the plunger 1812 and surround a perimeter of the follower 1814 so that the keeper 1850 keeps the follower 1814 connected to the plunger 1812 and will not allow the follower 1814 to leave the intended space claim within the assembly 1800, which may otherwise jam the pump in the event the camshaft exceeds the no follow speed limit.

Now referring to FIGS. 7A-7B, the keeper 1850 includes an upper portion 1852 and a lower portion 1854, wherein the upper portion 1852 includes at least one magnet aperture 1856 configured to hold a magnet 1858 (FIG. 7B). Illustratively, the upper portion 1852 includes a plurality of magnet apertures 1856 surrounding a circumference of the upper portion 1852, including at least three magnet apertures, at least five magnet apertures, at least seven magnet apertures, at least nine magnet apertures, at least ten magnet apertures, at least eleven magnet apertures, at least twelve magnet apertures, or a greater or fewer number of magnet apertures as desired. As shown, the magnet apertures 1856 are sized and shaped to receive a magnet 1858, wherein the magnet apertures 1856 are generally round and configured to receive spherical, cylindrical, or round and flat magnets. In other embodiments, the magnet apertures 1856 may be generally rectangular in shape or include any shape that is configured to receive a corresponding magnet, which may also include the shape of cubes, rectangular prisms, triangular prisms, pyramids, or generally any other shape corresponding to the shape of the corresponding magnet aperture 1856. At least a portion of an inner surface 1870 of the upper portion 1854 may be arcuate in shape, corresponding to the shape of a foot 1816 (FIG. 7D) of the corresponding plunger 1812 (FIG. 7D) so that movement of the plunger 1812 (FIG. 7D) remains uninhibited during operation.

The lower portion 1854 of the keeper 1850 may include at least one tab 1860 to facilitate coupling of the keeper 1850 to the follower 1814 (FIG. 7C). Illustratively, the lower portion 1854 includes a plurality of tabs 1860 surrounding a circumference of the lower portion 1854, including at least three tabs, at least five tabs, at least seven tabs, at least nine tabs, at least eleven tabs, at least twelve tabs, at least thirteen tabs, or a greater or fewer number of tabs as desired. The inclusion of the tabs 1860 to facilitate coupling of the keeper 1850 to the follower 1814 (FIG. 7C) provides some flexibility of the lower portion 1854 of the keeper 1850 during coupling of the keeper 1850 to the follower 1814. The circumference of the lower portion 1854 is relatively smaller than the circumference of the upper portion 1852 so that the lower portion 1854 of the keeper 1850 is capable of forming a tight-fitting coupling with the follower 1814 while keeping movement of the plunger 1812 (FIG. 7D) uninhibited when the pump is operating under proper conditions as described above. In other embodiments, the lower portion 1854 of the keeper 1850 may not include tabs, but instead be formed of a substantially continuous wall.

FIGS. 7C-7D illustrate the keeper 1850 in assembly with the follower 1814 (FIG. 7C) and the plunger 1812 (FIG. 7D). As illustrated, the keeper 1850 is coupled to the follower 1814 so that the upper portion 1852 of the keeper is exposed to the plunger 1812 over a top surface 1822 of the follower 1814. As such, when assembled with the plunger 1812, the upper portion 1852 of the follower 1814 generally surrounds at least a portion of the plunger 1812. The magnets 1858 held by the upper portion 1852 of the keeper 1850 form a magnetic attraction with the plunger 1812, so that if the assembly 1800 exceeds the no follow speed limit, the magnetic force of the keeper 1850 maintains the connection of the plunger 1812 with the follower 1814.

Figure 8A:
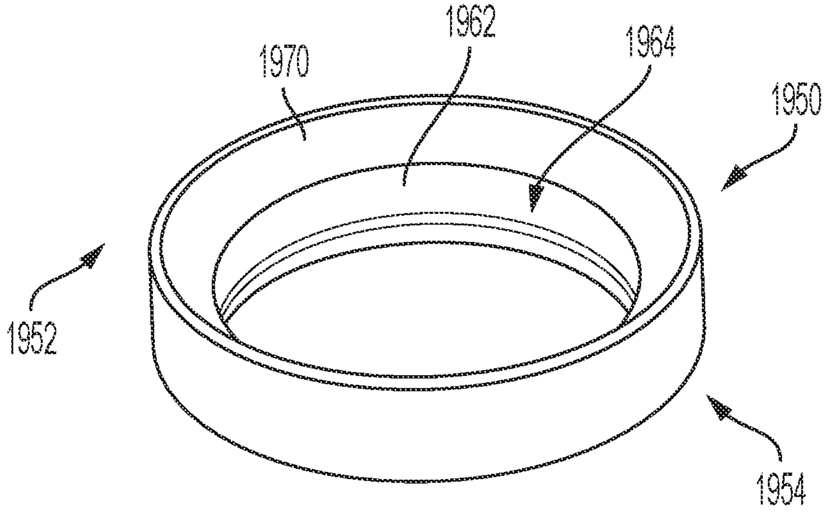
FIG. 8A is a perspective view of another illustrative embodiment of a keeper for use with the high-pressure fuel pump of FIG. 6.
Figure 8B:
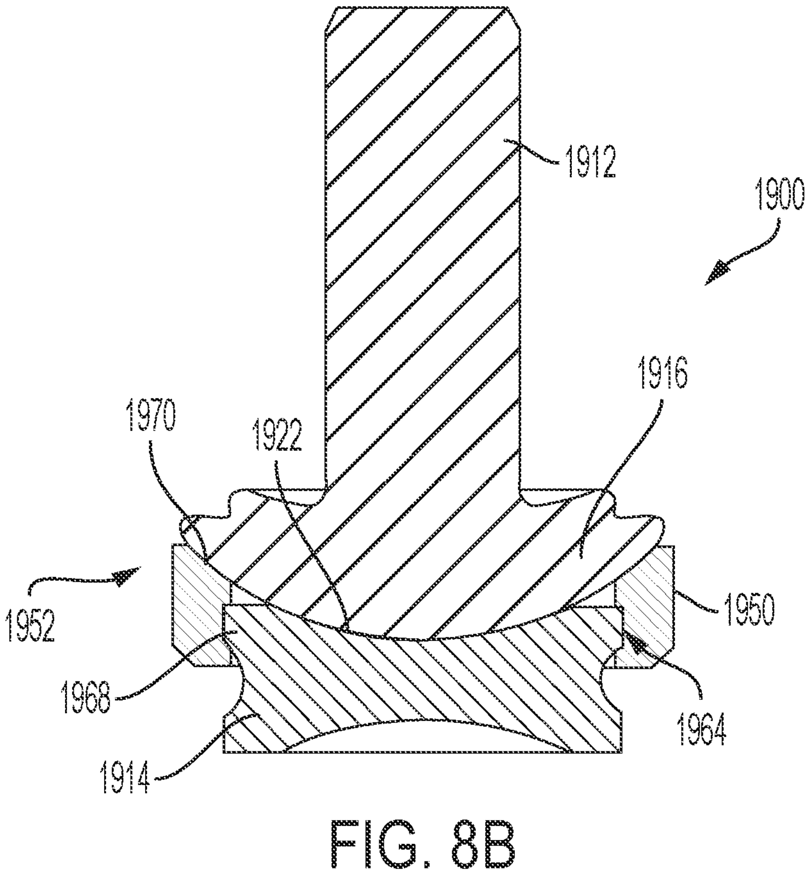
FIG. 8B is a cross-sectional view of a single barrel unit of FIG. 6 coupled with the keeper of FIG. 8A.

Now referring to FIGS. 8A-8B, another embodiment of a keeper 1950 is provided. The keeper 1950 generally functions the same as keeper 1850 and provides similar benefits to assembly 1900, which may be interchangeable with assembly 200, 300, 400, 500 as disclosed herein. Like the keeper 1850, the keeper 1950 may be utilized to keep the follower 1914, which is interchangeable with any of the followers 114, 314, 414, 514 disclosed herein, connected to the corresponding plunger 1912, which is interchangeable with any of the plungers 112, 312, 412, 512 disclosed herein. The keeper 1950 is illustratively coupled to the follower 1914 via interference fit or press fit. In other embodiments, the keeper 1950 may be coupled to the follower 1914 using other mechanisms as known in the art and described above. The keeper 1950 is sized and shaped to generally surround a portion of the plunger 1912 and surround a perimeter of the follower 1914 so that the keeper 1950 keeps the follower 1914 connected to the plunger 1912 and will not allow the follower 1914 to leave the intended space claim within the assembly 1900.

As shown in FIG. 8A, the keeper 1950 may be formed of a shaped ring magnet, including an upper portion 1952 and a lower portion 1954. Both the upper portion 1952 and the lower portion 1954 may have magnetic properties. In other embodiments, only the upper portion 1952 may have magnetic properties. Illustratively, an outer circumference of the keeper 1950 may be substantially consistent between the upper portion 1952 and the lower portion 1954, while an inner circumference of the lower portion 1954 is relatively smaller than the inner circumference of the upper portion 1952 so that the lower portion 1954 of the keeper 1950 is capable of forming a tight-fitting coupling with the follower 1914 while keeping movement of the plunger 1912 (FIG. 8B) uninhibited when the pump is operating under proper conditions as described above. At least a portion of an inner surface 1970 of the upper portion 1954 may be arcuate in shape, corresponding to the shape of a foot 1916 of the corresponding plunger 1912 so that movement of the plunger 1912 remains uninhibited during operation. An interior surface 1962 of the lower portion 1954 may include a coupling groove 1964 configured to mate with an upper flange 1968 of the follower 1914 to further facilitate a secure coupling of the keeper 1950 with the follower 1914. In other embodiments, the lower portion 1954 may not include a coupling groove 1964.

FIG. 8B illustrates the keeper 1950 in assembly with the follower 1914 and the plunger 1912. As illustrated, the keeper 1950 is coupled to the follower 1914 so that the upper portion 1952 of the keeper is exposed to the plunger 1912 over a top surface 1922 of the follower 1914. As such, when assembled with the plunger 1912, the upper portion 1952 of the follower 1914 generally surrounds at least a portion of the plunger 1912. The magnetic characteristic of the upper portion 1952 of the keeper 1950 forms a magnetic attraction with the plunger 1912, so that if the assembly 1900 exceeds the no follow speed limit, the magnetic force of the keeper 1950 maintains the connection of the plunger 1912 with the follower 1914.

The magnetic characteristic of either of the keepers 1850, 1950 may also attract metallic wear products produced by operation of the corresponding assembly 1800, 1900, keeping the metallic wear products away from the working contact faces of joints in the pump.

Figure 9:
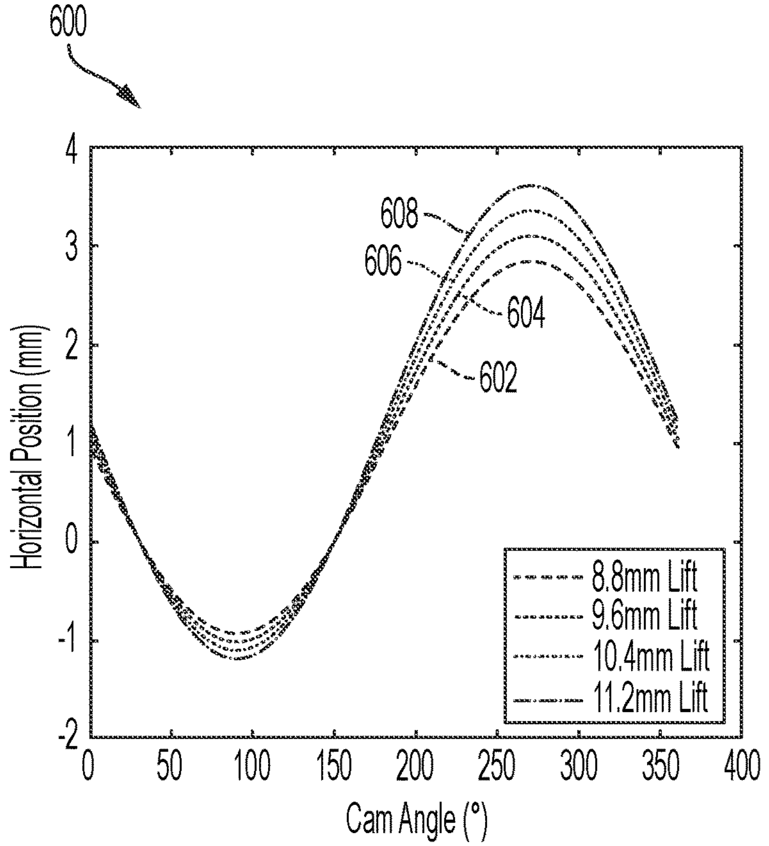
FIG. 9 is a chart illustrating a plunger and follower horizontal position versus a cam angle with relation to a cam lift.

Now referring to FIG. 9, a chart 600 portraying specified kinematics of the plunger and follower horizontal position (mm) versus the cam angle (°) is shown, with relation to the cam lift (mm) as illustrated by lines 602, 604, 606, and 608. Line 602 tracks the horizontal position and cam angle during operation of a cam lift of 8.8 mm. Line 604 tracks the horizontal position and cam angle during operation of a cam lift of 9.6 mm. Line 606 tracks the horizontal position and cam angle during operation of a cam lift of 10.4 mm. Line 608 tracks the horizontal position and cam angle during operation of a cam lift of 11.2 mm. As shown, the horizontal position varies from a range of about −1 to about −2 mm at the bottom position, with a cam angle from about 50° to about 150°, to about 2 mm to about 4 mm at the top position, with a cam angle of from about 200° to about 300°, depending on the cam lift.

Figure 10:
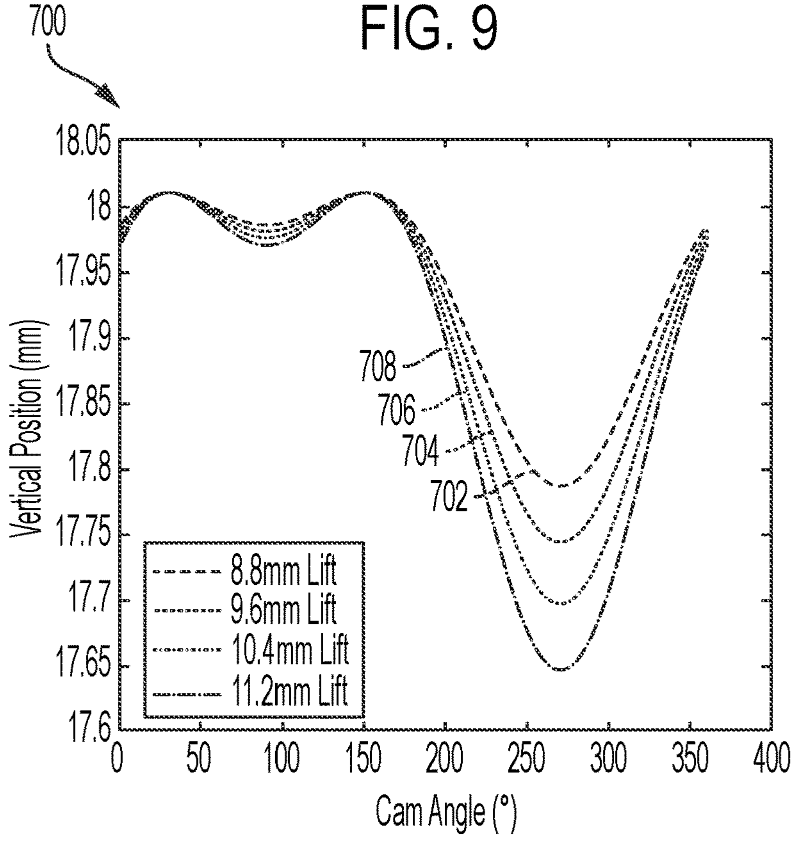
FIG. 10 is a chart illustrating a plunger and follower vertical position versus a cam angle with relation to a cam lift.

Referring to FIG. 10, a chart 700 portraying specified kinematics of the plunger and follower vertical position (mm) versus the cam angle (°) is shown, with relation to the cam lift (mm) as illustrated by lines 702, 704, 706, and 708. Line 702 tracks the vertical position and cam angle during operation of a cam lift of 8.8 mm. Line 704 tracks the vertical position and cam angle during operation of a cam lift of 9.6 mm. Line 706 tracks the vertical position and cam angle during operation of a cam lift of 10.4 mm. Line 708 tracks the vertical position and cam angle during operation of a cam lift of 11.2 mm. As shown, the vertical position generally oscillates between a vertical position of about 17.95 mm to about 18.02 mm with a cam angle of 0° to about 150°, depending on the cam lift. Then, the vertical position varies from a range of about 17.67 mm to about 17.8 mm with a cam angle of about 200° to 300°, depending on the cam lift.

Figure 11:
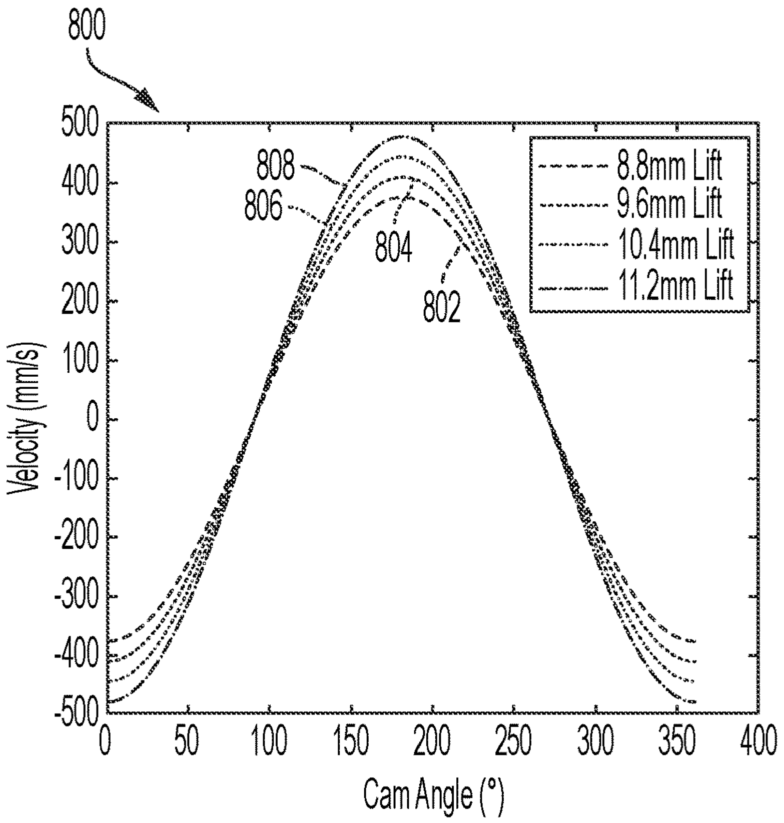
FIG. 11 is a chart illustrating a relative velocity of a plunger and follower versus a cam angle with relation to a cam lift.

Now referring to FIG. 11, a chart 800 portraying specified kinematics of the relative velocity (mm/s) of the plunger and follower versus the cam angle (°) is shown, with relation to the cam lift (mm) as illustrated by lines 802, 804, 806, and 808. Line 802 tracks the velocity and cam angle during operation of a cam lift of 8.8 mm. Line 804 tracks the velocity and cam angle during operation of a cam lift of 9.6 mm. Line 806 tracks the velocity and cam angle during operation of a cam lift of 10.4 mm. Line 808 tracks the velocity and cam angle during operation of a cam lift of 11.2 mm. As shown, the plunger and follower reaches a maximum relative velocity of about 300 mm/s to about 500 mm/s at a cam angle between about 100° and about 300°, depending on the cam lift.

Figure 12:
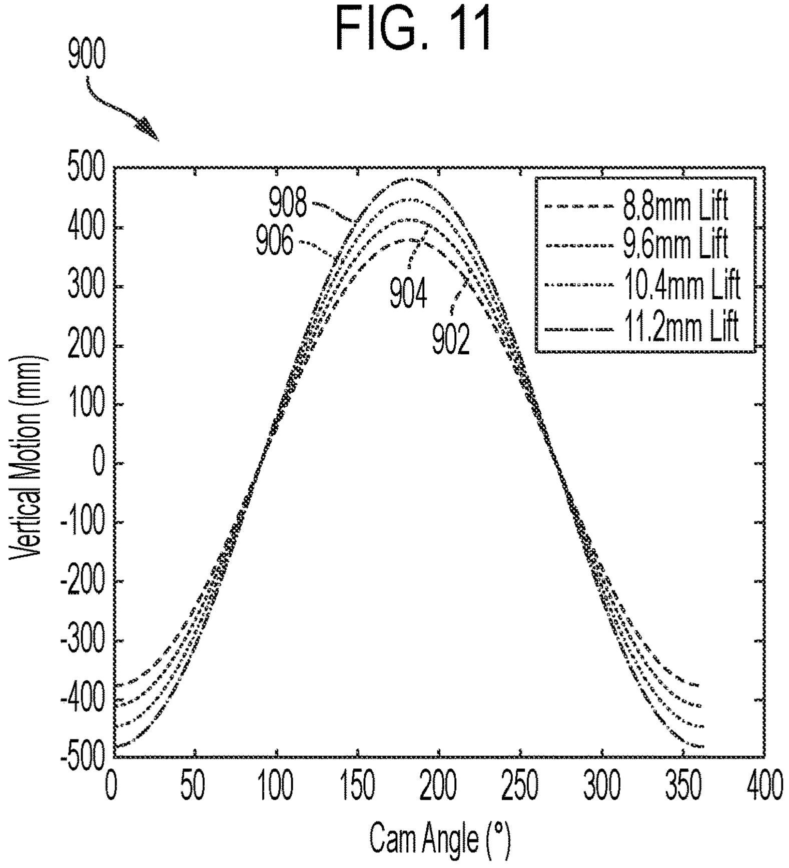
FIG. 12 is a chart illustrating an oscillating velocity of a follower and cam versus a cam angle with relation to a cam lift.

Referring to FIG. 12, a chart 900 portraying specified kinematics of the oscillating velocity (mm/s) of the follower and cam versus the cam angle (°) is shown, with relation to the cam lift as illustrated by lines 902, 904, 906, and 908. Line 902 tracks the relative velocity and cam angle during operation of a cam lift of 8.8 mm. Line 904 tracks the relative velocity and cam angle during operation of a cam lift of 9.6 mm. Line 906 tracks the relative velocity and cam angle during operation of a cam lift of 10.4 mm. Line 908 tracks the relative velocity and cam angle during operation of a cam lift of 11.2 mm. As shown, the maximum relative velocity reaches about 300 mm/s to about 500 mm/s at a cam angle of about 100° to about 250°, depending on the cam lift.

Figure 13:
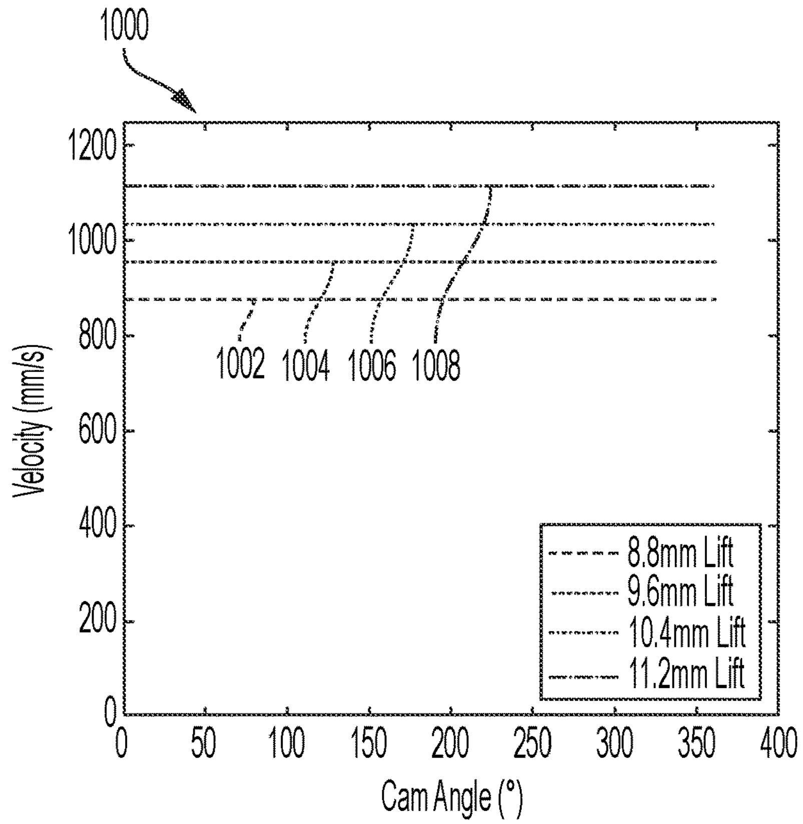
FIG. 13 is a chart illustrating a velocity of an eccentric cam lobe versus a cam angle with relation to a cam lift.

Referring to FIG. 13, a chart 1000 portraying specified kinematics of the velocity (mm/s) of an eccentric cam lobe versus the cam angle (°) is shown, with relation to the cam lift as illustrated by lines 1002, 1004, 1006, and 1008. Line 1002 tracks the velocity and cam angle during operation of a cam lift of 8.8 mm. Line 1004 tracks the velocity and cam angle during operation of a cam lift of 9.6 mm. Line 1006 tracks the velocity and cam angle during operation of a cam lift of 10.4 mm. Line 1008 tracks the velocity and cam angle during operation of a cam lift of 11.2 mm. As shown, the velocity of the cam lobe is constant, but dependent upon the cam lift. The velocity of the cam lobe is about 880 mm/s with a cam lift of 8.8 mm. The velocity of the cam lobe is about 950 mm/s with a cam lift of 9.6 mm. The velocity of the cam lobe is about 1050 mm/s with a cam lift of 10.4 mm. The velocity of the cam lobe is about 1100 mm/s with a cam lift of 11.2 mm.

Figure 14:
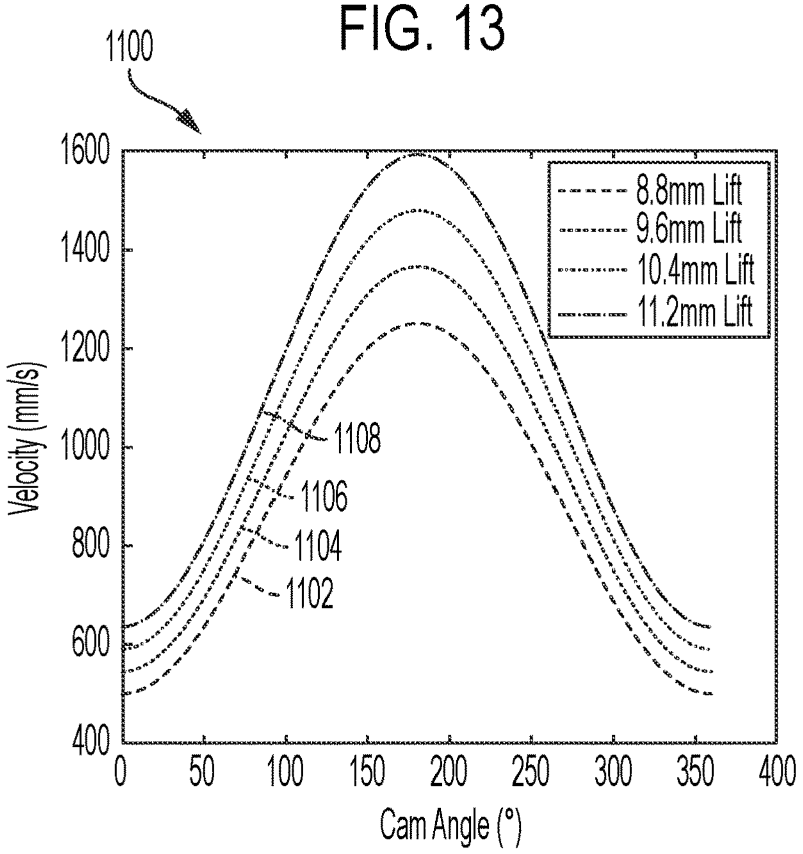
FIG. 14 is a chart illustrating a velocity of a follower and cam versus a cam angle with relation to a cam lift.

Referring to FIG. 14, a chart 1100 portraying the specified kinematics of the relative velocity (mm/s) of the follower and cam versus the cam angle (°) is shown, with relation to the cam lift as illustrated by lines 1102, 1104, 1106, and 1108. Line 1102 tracks the velocity and cam angle during operation of a cam lift of 8.8 mm. Line 1104 tracks the velocity and cam angle during operation of a cam lift of 9.6 mm. Line 1106 tracks the velocity and cam angle during operation of a cam lift of 10.4 mm. Line 1108 tracks the velocity and cam angle during operation of a cam lift of 11.2 mm. As shown, the relative follower and cam velocity reaches a maximum velocity of about 1200 mm/s to about 1600 mm/s with a cam angle of about 100° to about 200°, depending on the cam lift.

Figure 15:
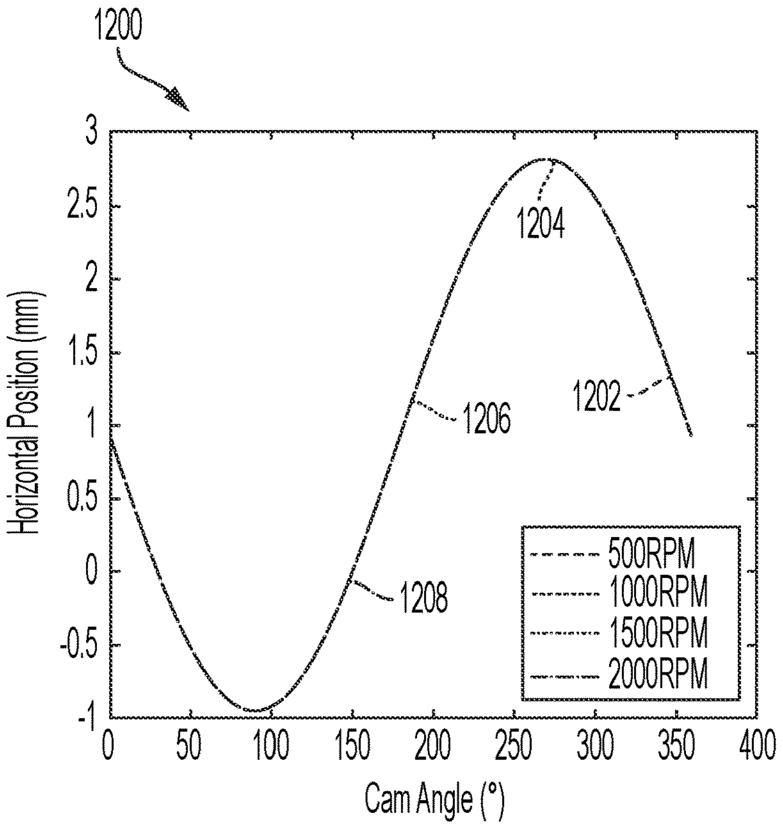
FIG. 15 is a chart illustrating a horizontal position of a follower and plunger versus a cam angle with relation to a rate of revolutions per minute of a camshaft assembly.

Referring to FIG. 15, a chart 1200 portraying the specified kinematics of the horizontal position (mm) of the follower and plunger versus the cam angle (°) is shown, with relation to the revolutions per minute (rpm) of the camshaft assembly as illustrated by lines 1202, 1204, 1206, and 1208. Line 1202 tracks the horizontal position and cam angle at a rate of 500 rpm. Line 1204 tracks the horizontal position and cam angle at a rate of 1000 rpm. Line 1206 tracks the horizontal position and cam angle at a rate of 1500 rpm. Line 1208 tracks the horizontal position and cam angle at a rate of 2000 rpm. As shown, the horizontal position of the follower and plunger follows the same oscillating pattern between about −1 mm and about 2.8 mm regardless of the revolutions per minute of the camshaft assembly.

Figure 16:
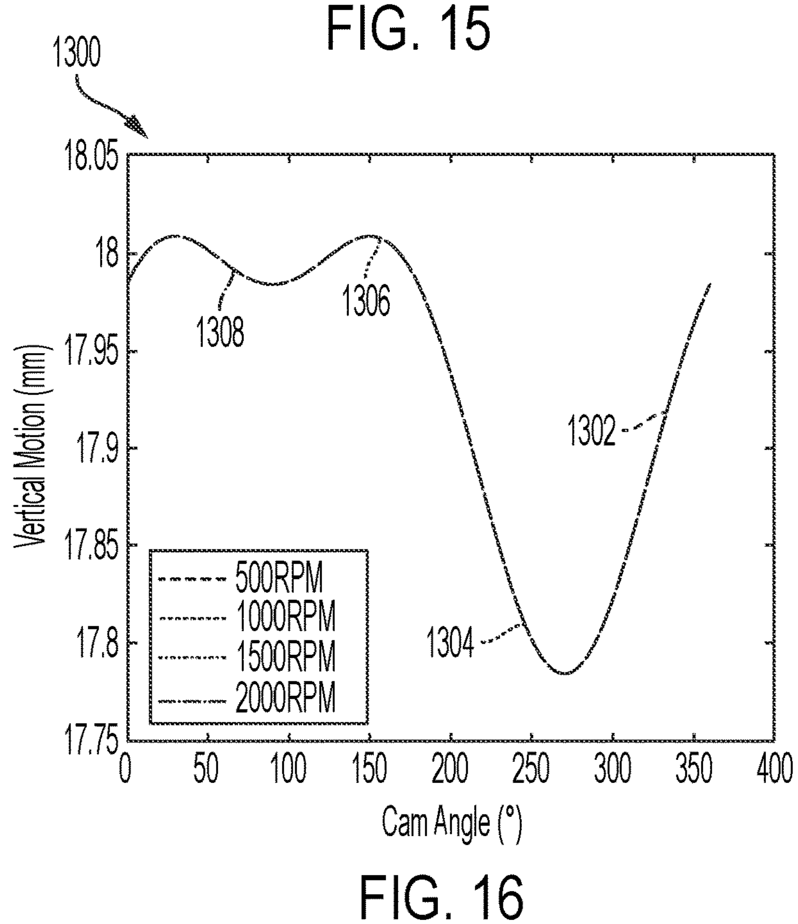
FIG. 16 is a chart illustrating a vertical position of a follower and plunger versus a cam angle with relation to a rate of revolutions per minute of a camshaft assembly.

Now referring to FIG. 16, a chart 1300 portraying the specified kinematics of the vertical position (mm) of the follower and plunger versus the cam angle (°) is shown, with relation to the revolutions per minute (rpm) of the camshaft assembly as illustrated by lines 1302, 1304, 1306, and 1308. Line 1302 tracks the vertical position and cam angle at a rate of 500 rpm. Line 1304 tracks the vertical position and cam angle at a rate of 1000 rpm. Line 1306 tracks the vertical position and cam angle at a rate of 1500 rpm. Line 1308 tracks the vertical position and cam angle at a rate of 2000 rpm. As shown, the vertical position of the follower and plunger follows the same oscillating pattern between about 17.95 mm and about 18.03 mm with a cam angle of between about 0° to about 150°, regardless of the revolutions per minute of the camshaft assembly. Additionally, the vertical position of the follower and plunger drops to about 17.76 mm at a cam angle of about 260°, regardless of the revolutions per minute of the camshaft assembly.

Figure 17:
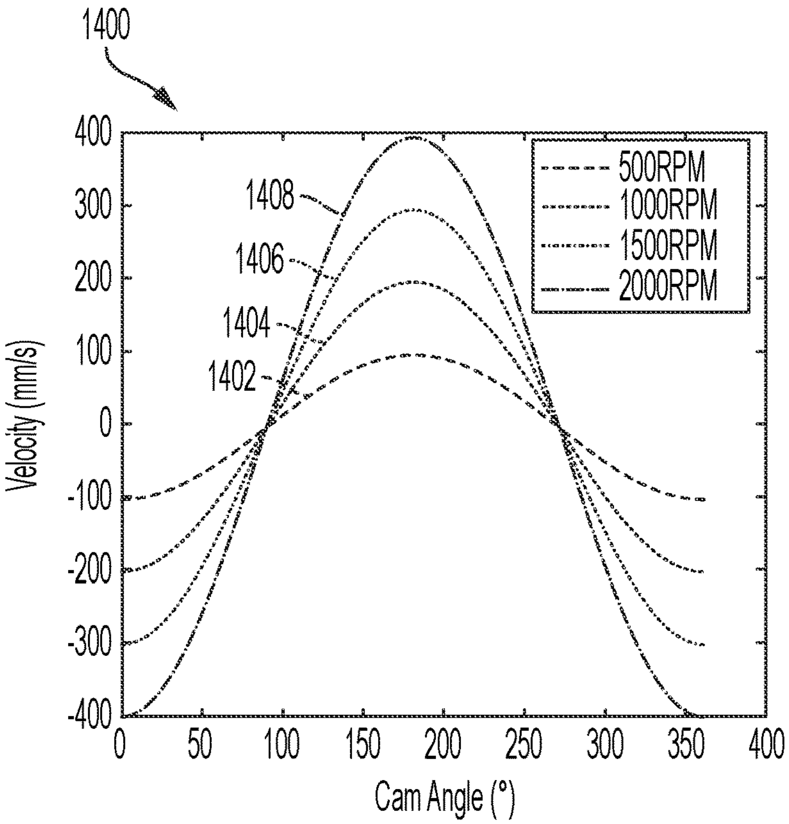
FIG. 17 is a chart illustrating a relative velocity of a follower and plunger versus a cam angle with relation to a rate of revolutions per minute of a camshaft assembly.

Now referring to FIG. 17, a chart 1400 portraying the specified kinematics of the relative velocity (mm/s) of the follower and plunger versus the cam angle (°) is shown, with relation to the revolutions per minute (rpm) of the camshaft assembly as illustrated by lines 1402, 1404, 1406, and 1408. Line 1402 tracks the relative velocity and cam angle at a rate of 500 rpm. Line 1404 tracks the relative velocity and cam angle at a rate of 1000 rpm. Line 1406 tracks the relative velocity and cam angle at a rate of 1500 rpm. Line 1408 tracks the relative velocity and cam angle at a rate of 2000 rpm. As shown, the relative velocity of the follower and plunger varies from about −100 mm/s to about −400 mm/s at a cam angle of about 0° and at a cam angle of about 360°, depending on the revolutions per minute of the camshaft. The maximum relative velocity of the follower and plunger varies from about 100 mm/s to about 400 mm/s at a cam angle of between about 100° to about 200°, depending on the revolutions per minute of the camshaft.

Figure 18:
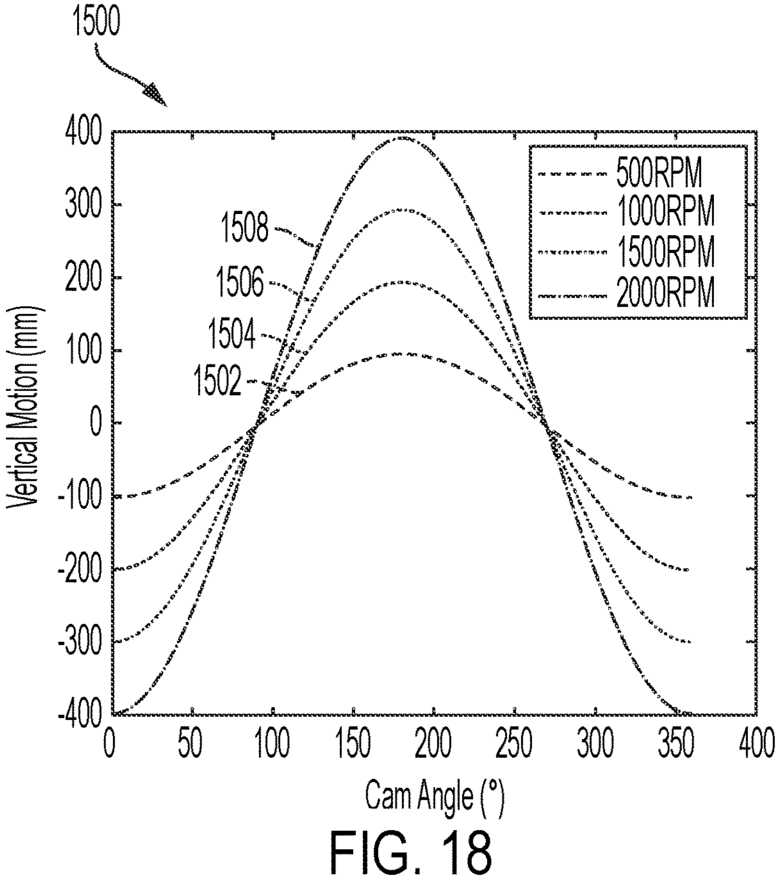
FIG. 18 is a chart illustrating an oscillating velocity of a follower and cam versus a cam angle with relation to a rate of revolutions per minute of a camshaft assembly.

Referring to FIG. 18, a chart 1500 portraying the specified kinematics of the oscillating velocity (mm/s) of the follower and the cam versus the cam angle (°) is shown, with relation to the revolutions per minute (rpm) of the camshaft assembly as illustrated by lines 1502, 1504, 1506, and 1508. Line 1502 tracks the oscillating velocity and cam angle at a rate of 500 rpm. Line 1504 tracks the oscillating velocity and cam angle at a rate of 1000 rpm. Line 1506 tracks the oscillating velocity and cam angle at a rate of 1500 rpm. Line 1508 tracks the oscillating velocity and cam angle at a rate of 2000 rpm. As shown, the oscillating velocity of the follower and cam varies from about −100 mm/s to about −400 mm/s at a cam angle of about 0° and at a cam angle of about 360°, depending on the revolutions per minute of the camshaft. The maximum oscillating velocity of the follower and plunger varies from about 100 mm/s to about 400 mm/s at a cam angle of between about 100° to about 200°, depending on the revolutions per minute of the camshaft.

Figure 19:
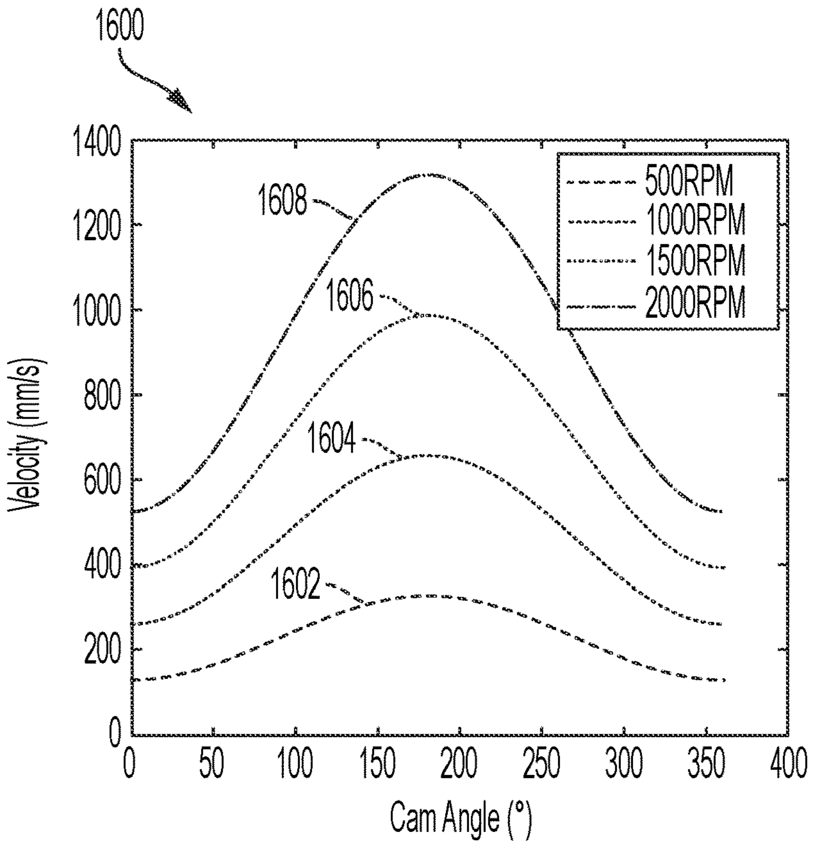
FIG. 19 is a chart illustrating a relative velocity of a follower and cam versus a cam angle with relation to a rate of revolutions per minute of a camshaft assembly.

Now referring to FIG. 19, a chart 1600 portraying the specified kinematics of the relative velocity (mm/s) of the follower and the cam versus the cam angle (°) is shown, with relation to the revolutions per minute (rpm) of the camshaft assembly as illustrated by lines 1602, 1604, 1606, and 1608. Line 1602 tracks the relative velocity and cam angle at a rate of 500 rpm. Line 1604 tracks the relative velocity and cam angle at a rate of 1000 rpm. Line 1606 tracks the relative velocity and cam angle at a rate of 1500 rpm. Line 1608 tracks the relative velocity and cam angle at a rate of 2000 rpm. As shown, the relative velocity of the follower and cam varies from about 120 mm/s to about 550 mm/s at a cam angle of about 0° and about 360°. The maximum relative velocity of the follower and cam varies from about 210 mm/s to about 1350 mm/s at a cam angle of about 150° to about 200°, depending on the revolutions per minute of the camshaft.

Figure 20:
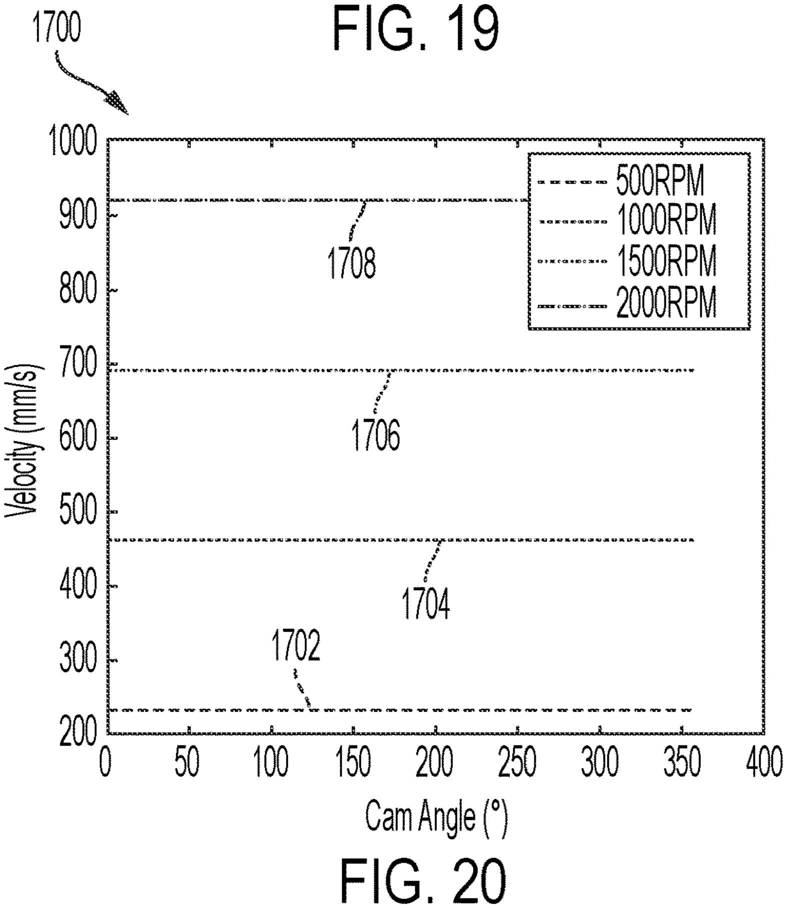
FIG. 20 is a chart illustrating a cam lobe velocity versus a cam angle with relation to a rate of revolutions per minute of a camshaft assembly.

Referring to FIG. 20, a chart 1700 portraying the specified kinematics of the cam lobe velocity (mm/s) versus the cam angle (°) is shown, with relation to the revolutions per minute (rpm) of the camshaft assembly as illustrated by lines 1702, 1704, 1706, and 1708. Line 1702 tracks the velocity and cam angle at a rate of 500 rpm. Line 1704 tracks the velocity and cam angle at a rate of 1000 rpm. Line 1706 tracks the velocity and cam angle at a rate of 1500 rpm. Line 1708 tracks the velocity and cam angle at a rate of 2000 rpm. As shown, the cam lobe velocity remains constant dependent upon the revolutions per minute of the cam shaft. At a rate of 500 rpm, the cam lobe velocity remains constant at about 220 mm/s. At a rate of 1000 rpm, the cam lobe velocity remains constant at about 460 mm/s. At a rate of 1500 rpm, the cam lobe velocity remains constant at about 695 mm/s. At a rate of 2000 rpm, the cam lobe velocity remains constant at about 910 mm/s.

While the invention has been described by reference to various specific embodiments it should be understood that numerous changes may be made within the spirit and scope of the inventive concepts described, accordingly, it is intended that the invention not be limited to the described embodiments but will have full scope defined by the language of the following claims.

What is claimed is:

1. A fuel pump, comprising:
- a camshaft assembly including an offset lobe having a lobe surface, the lobe surface defining a first arcuate surface and the camshaft assembly configured to rotate about a first axis;
- a barrel unit disposed on the fuel pump, the barrel unit having a second axis substantially perpendicular to the first axis;
- a plunger disposed within the barrel unit for movement along the second axis, the plunger including a foot having a second arcuate surface; and
- a follower disposed between the foot of the plunger and the lobe surface, the follower having a third arcuate surface in contact with the second arcuate surface and a fourth arcuate surface in contact with the first arcuate surface, wherein the third arcuate surface of the follower and the second arcuate surface of the plunger define a first contact interface between the follower and the plunger during movement of the follower, and the fourth arcuate surface of the follower and the first arcuate surface of the lobe surface define a second contact interface between the follower and the offset lobe during movement of the follower, and the first and second contact interfaces are each ring shaped around the second axis along which the plunger moves within the barrel unit,
- wherein the fourth arcuate surface of the follower is in sliding contact to mate with the first arcuate surface of the lobe surface and the third arcuate surface of the follower is in sliding contact to mate with the second arcuate surface of the plunger and are configured so that a radial load resulting from the mating arcuate surfaces keeps the follower constrained in place to prevent rolling and translate rotational movement of the camshaft assembly into movement of the plunger along the second axis.

2. The fuel pump of claim 1, further comprising a plurality of barrel units disposed on the fuel pump, wherein the plurality of barrel units are in an opposed piston pump arrangement.

3. The fuel pump of claim 1, further comprising a spring positioned within the barrel unit and disposed around the plunger to bias the plunger towards the camshaft assembly.

4. The fuel pump of claim 1, wherein axial motion of the plunger corresponds with the rotational movement of the camshaft assembly.

5. The fuel pump of claim 1, further comprising a keeper, the keeper comprising:
- a lower portion configured to couple to the follower; and
- an upper portion having magnetic properties;
- wherein the upper portion surrounds at least a portion of the foot of the plunger.

6. The fuel pump of claim 1, wherein the foot is integrally formed with the plunger.

7. The fuel pump of claim 1, wherein the offset lobe is an eccentric cam lobe and the lobe surface encircles the eccentric cam lobe.

8. A barrel unit for a fuel pump, comprising:
- a plunger disposed within the barrel unit for movement along an axis, the plunger including a foot having a first arcuate surface; and
- a follower having a second arcuate surface in contact with the first arcuate surface, the follower further including a third arcuate surface configured to contact a fourth arcuate surface of a cam lobe of a camshaft assembly, wherein the second arcuate surface of the follower and the first arcuate surface of the plunger define a first contact interface between the follower and the plunger during movement of the follower, and the third arcuate surface of the follower and the fourth arcuate surface of the cam lobe define a second contact interface between the follower and the cam lobe during movement of the follower, and the first and second contact interfaces are each ring shaped around the axis along which the plunger moves,
- wherein the second arcuate surface of the follower is in slidable contact to mate with the first arcuate surface of the plunger and the third arcuate surface of the follower is in slidable contact to mate with the fourth arcuate surface of the cam lobe and are configured so that a radial load resulting from the mating arcuate surfaces keeps the follower constrained in place to prevent rolling and translate rotational movement of the camshaft assembly into movement of the plunger along the axis.

9. The barrel unit of claim 8, wherein the second arcuate surface of the follower and the third arcuate surface of the follower are concave spherical surfaces.

10. The barrel unit of claim 8, wherein the second arcuate surface of the follower is a convex spherical surface and the third arcuate surface of the follower is a concave spherical surface.

11. The barrel unit of claim 8, wherein a first center of the first arcuate surface does not contact a second center of the second arcuate surface so that the first contact interface between the follower and the plunger forms the ring shape around the axis.

12. The barrel unit of claim 8, wherein the first arcuate surface of the foot of the plunger is a convex spherical surface.

13. The barrel unit of claim 8, wherein the foot of the plunger is a concave spherical surface.

14. The barrel unit of claim 8, further comprising a keeper, the keeper comprising:
- a lower portion configured to couple to the follower; and
- an upper portion having magnetic properties;
- wherein the upper portion surrounds at least a portion of the foot of the plunger.

15. The barrel unit of claim 8, wherein the foot is integrally formed with the plunger.

16. A fuel pump, comprising:
- a camshaft assembly including an offset lobe having a lobe surface, the camshaft assembly configured to rotate about a first axis;
- a barrel unit disposed on the fuel pump and including a plunger disposed within the barrel unit, the plunger configured to axially move within the barrel unit along a second axis; and
- a follower disposed between the plunger and the lobe surface in slidable contact with the plunger and the lobe surface, the follower including a first arcuate surface and a second arcuate surface and configured to mate to have a sliding relationship at each of the second arcuate surface and the plunger and the first arcuate surface and the lobe surface so that a radial load resulting from the mating surfaces keeps the follower constrained in place to prevent rolling and facilitate translation of rotational movement of the camshaft assembly to axial movement of the plunger, wherein the plunger includes a third arcuate surface in contact with the second arcuate surface of the follower to define a first contact interface between the follower and the plunger during movement of the follower, and the lobe surface defines a fourth arcuate surface in contact with the first arcuate surface of the follower to define a second contact interface between the follower and the offset lobe during movement of the follower, and each of the first and second contact interfaces forms a ring shape around the second axis along which the plunger moves within the barrel unit.

17. The fuel pump of claim 16, further comprising a plurality of barrel units disposed on the fuel pump, wherein the plurality of barrel units are in an opposed piston pump arrangement.

18. The fuel pump of claim 16, wherein the first arcuate surface and the second arcuate surface are asymmetrical.

19. The fuel pump of claim 18, the plunger comprising an end portion configured to contact the first arcuate surface of the follower.

20. The fuel pump of claim 19, wherein the end portion of the plunger comprises a foot.

21. The fuel pump of claim 16, wherein the offset lobe is an eccentric cam lobe and the lobe surface encircles the eccentric cam lobe.

* * * * *